United States Patent Office 3,015,552
Patented Jan. 2, 1962

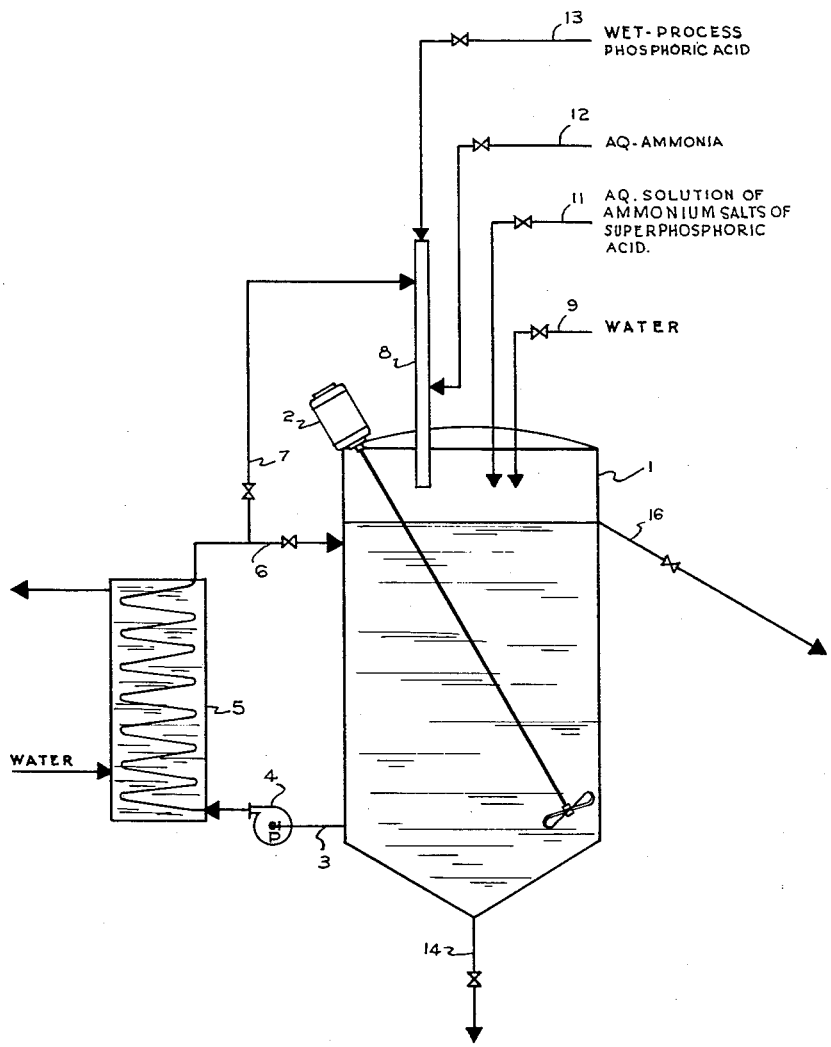

3,015,552
PROCESS FOR PREPARING STABLE LIQUID FERTILIZER AND PRODUCT THEREOF
Marcus M. Striplin, Jr., Florence, John M. Stinson, Sheffield, and James A. Wilbanks, Florence, Ala., assignors to Tennessee Valley Authority, a corporation of the United States of America
Filed June 9, 1958, Ser. No. 740,982
4 Claims. (Cl. 71—41)
(Granted under Title 35, U.S. Code (1952), sec. 266)

The invention herein described may be manufactured and used by or for the Government for governmental purposes without the payment to us of any royalty therefor.

This invention is an improved process for the manufacture of liquid fertilizers from materials comprising ammonia and wet-process phosphoric acid.

During the past few years liquid fertilizers have become very popular, largely because of the ease with which liquids may be handled and applied. Many formulations have been proposed and used. The desirability of preparing such liquid fertilizers from cheap wet-process phosphoric acid and ammonia has been recognized since the beginning of the liquid fertilizer industry, but no commercially practical process has been developed for the production of substantially clear solutions of such fertilizers.

Wet-process phosphoric acid contains large quantities of compounds of iron and calcium and aluminum dissolved from phosphate rock. When an acid of this type is ammoniated, a heavy precipitate begins to form long before the acid is neutralized. This precipitate forms large deposits in the equipment used and is often troublesome. For this reason, many manufacturers regard liquid fertilizers made by ammoniation of wet-process phosphoric acid as impractical. There is a distinct preference in the trade for clear solutions, substantially free from precipitated solids. Therefore, most of the liquid fertilizer is produced from electric-furnace acid, in spite of the fact that this acid is more expensive than crude, impure wet-process acid.

The known sequestering effect of "Calgon" (sodium hexametaphosphate) resulted in attempts to use this material to prevent the formation of precipitates in liquid fertilizer made by ammoniating wet-process phosphoric acid. Ammonium, calcium, and potassium metaphosphates and ammonium orthophosphates also have been tried. When these materials are used, it is known that precipitation is as bad as or worse than it is if no sequestering agent at all is used. For example, when 10 percent of the total $P_2O_5$ requirement for an 8–24–0 grade liquid fertilizer was introduced as ammonium metaphosphate, potassium metaphosphate, or "Calgon," and the remainder of the $P_2O_5$ requirement was introduced as wet-process phosphoric acid and the mixture ammoniated, precipitates were formed which had a dry weight equivalent to 23 to 34 percent of the product.

Pyrophosphoric acid and potassium pyrophosphate also have been proposed as sequestering agents. In fact, sequestration of iron is the basis of one analytical method used for the determination of pyrophosphate. However, U.S. Patent 2,064,979 shows that pyrophosphoric acid and its salts are instantaneously hydrolyzed to orthophosphoric acid and orthophosphates when heated in the presence of aqueous orthophosphoric acid. Moreover, it is known that dilution of superphosphoric acid containing 82 to 84 percent $P_2O_5$ with sufficient water to convert it to 75 percent $H_3PO_4$ strength results in complete hydrolysis to orthophosphoric acid in less than 2 minutes (transactions, A. I. Ch. E., vol. 33, p. 653).

Crude wet-process phosphoric acid contains a large proportion of water and, usually, not more than 55 percent $P_2O_5$. Neutralization of this acid with ammonia liberates large quantities of heat. It is known that an increase in temperature of a solution of superphosphoric acid from room temperature to 212° F. results in an increase in its rate of hydrolysis to many times that at room temperature. In commercial-scale operation, conditions conducive to rapid hydrolysis can be expected. So far as we know, no one has attempted to use superphosphoric acid with wet-process phosphoric acid in the production of fertilizers. Manufacturers have continued to use the more expensive electric-furnace phosphoric acid for the production of liquid fertilizers.

It is an object of this invention to provide a process for the manufacture of liquid fertilizers from materials comprising wet-process phosphoric acid and ammonia in which substantially no precipitation occurs.

Another object is to provide such process which inherently results in a substantially clear, stable solution.

Another object is to provide such process in which corrosion problems are minimized; which is simple, easy, and inexpensive to operate, and which can be carried out in mild steel equipment usually present in existing fertilizer plants.

Still another object is to produce a novel, inexpensive liquid fertilizer in which precipitation of solids during storage does not occur.

Other objects and advantages will become apparent from the following description.

We have found that these objects are attained in a process which comprises introducing ammonium salts of substantially unhydrolyzed superphosphoric acid into a mixing vessel in such quantity as to supply as ammonium salts of polyphosphoric acids about 5 to 25 percent, or preferably 5 to 10 percent, of the total $P_2O_5$ content of a liquid fertilizer to be produced; introducing wet-process phosphoric acid and ammonia into the mixing vessel; therein intimately mixing them with each other and with ammonium salts of superphosphoric acid; controlling the rate of introduction of ammonia and wet-process phosphoric acid to maintain acidity of material in the vessel in the range from pH 4.0 to about 7.0; cooling the material during mixing to maintain a temperature of not more than about 200° F., preferably less than 180° F.; and withdrawing a stable, noncorrosive, concentrated liquid fertilizer from the vessel.

Although it is known that sodium hexametaphosphate and ammonium metaphosphate do not prevent the formation of heavy precipitates during ammoniation of wet-process phosphoric acid, we have found that the presence of as little as 5 to 10 percent of ammonium salts of polyphosphoric acids prepared by ammoniating superphosphoric acid prevents the formation of such precipitates.

The resulting substantially neutral concentrated fertilizer solutions contain large quantities of materials which normally precipitate on neutralization with ammonia. The presence of only sufficient ammonium polyphosphates prepared by ammoniating superphosphoric acid to furnish about 5 to 10 percent of the total $P_2O_5$ present causes the solutions to remain clear and free from precipitates for very long periods of time, even at low temperatures.

The term "superphosphoric acid" is used in this specification and claims to mean phosphoric acid containing more than 72.4 percent of $P_2O_5$, which is equivalent to 100 percent $H_3PO_4$. Such acid contains orthophosphoric acid in admixture with pyrophosphoric, metaphosphoric, and other polyphosphoric acids in proportions which, at equilibrium, are solely dependent on the concentration of $P_2O_5$ in the acid. Proportions of polyphosphoric acids present are shown in Transactions of the American Institute of Chemical Engineers, volume 33, page 648 (1937), and in the Canadian Journal of Chemistry, volume 34, page 790 (1956). The latter reference shows that superphosphoric acids containing 75 to 80 weight percent $P_2O_5$ contain approximately the following proportions of polyphosphoric acids:

| | Percent |
|---|---|
| Pyrophosphoric acid | 38 to 35 |
| Tripolyphosphoric acid | 5 to 24 |
| Tetrapolyphosphoric acid | 0 to 13 |
| Pentapolyphosphoric acid | 0 to 11 |
| Hexapolyphosphoric acid | 0 to 5 |
| Heptapolyphosphoric acid | 0 to 3 |

Although superphosphoric acid hydrolyzes very quickly to orthophosphoric acid at slightly elevated temperature when mixed with water, it is possible to ammoniate the superphosphoric acid substantially to the neutral point without any appreciable hydrolysis. The resulting solution of ammonium salts of polyphosphoric acids is stable, as is shown in the copending application of Striplin, Stinson, and Potts, Serial No. 624,177, filed November 23, 1956, now U.S. Letters Patent No. 2,950,961.

The attached drawing illustrates diagrammatically one method for carrying out our process. This method will be described as a batchwise operation, although it is to be understood that it may be carried out in a continuous manner if desired. Many fertilizer manufacturers prefer a batchwise process for preparing liquid fertilizers, because less metering equipment is required and the volume of materials added is easily determined.

In the drawing the reference numeral 1 designates any suitable mixing vessel equipped with an agitator 2. Suitable piping 3 containing a pump 4 is provided to conduct a stream of liquid from vessel 1 to a cooler 5. Liquid is returned to vessel 1 via lines 6, 7, and 8. Line 8 is a preliminary mixing and reaction tube and may be considered as a part of mixing vessel 1.

For batchwise operation, water in the quantity desired in the product is first admitted through line 9. A mark may be made on the side of vessel 1 to show the proper quantity and to eliminate the necessity for a meter. An ammoniated superphosphoric acid containing ammonium salts of pyrophosphoric acid and other polyphosphoric acids is introduced through line 11 and is mixed with the water. The quantity and composition of the ammoniated superphosphoric acid used is chosen so as to furnish as ammonium salts of polyphosphoric acids about 5 to 25 percent of the total $P_2O_5$ content of the fertilizer to be produced. We prefer to use an ammoniated superphosphoric acid corresponding to fertilizer grades in the range from about 11–33–0 to about 13–46–0, prepared by neutralizing superphosphoric acid containing about 75 to 80 percent $P_2O_5$ with ammonia, although the process is operable with other strengths of such ammonium salts.

Pump 4 is then started, and a side stream is drawn from the return stream via line 7. Wet-process phosphoric acid and aqueous ammonia are fed through lines 12 and 13. The wet-process acid, cooled aqueous solution of ammonium salts, and aqueous ammonia enter the preliminary reaction and mixing tube 8. Tube 8 is not absolutely necessary. The acid and ammonia may be fed directly to the mixing vessel 1, but we prefer to use tube 8 because its use makes temperature control easier and minimizes localized overalkalization with resulting formation of a precipitate which has to be agitated for some time to redissolve.

Addition of water to vessel 1 may be omitted and gaseous ammonia may be substituted for aqueous ammonia if the solution of ammonium salts of polyphosphoric acid and/or the wet-process acid are sufficiently dilute. However, we prefer to operate as described, since the liquids usually are produced at concentrations which require dilution, and this is easily done in a single step.

The streams of wet-process phosphoric acid and ammonia are controlled to maintain a pH of 4.0 to about 7.0, preferably pH 6.0 to 6.7, during mixing in vessel 1. Cooling is carried out in cooler 5 to prevent the mixture in vessel 1 from exceeding a temperature of about 200° F., and preferably maintaining it below 180° F. Under these conditions there is practically no hydrolysis of ammonium polyphosphates during mixing and neutralization.

Cooling coils in vessel 1 may be substituted for cooler 5 if desired, but we prefer to use an exterior cooler as shown when acid and ammonia are introduced through a tube such as 8.

When the complete batch has been thoroughly mixed, it is withdrawn to storage or use via line 14.

If it is desired to operate continuously, operation is started as described for batch operation. When vessel 1 is filled to overflow pipe 16, accurately metered streams of water, ammoniated superphosphoric acid, wet-process phosphoric acid, and ammonia are introduced continuously. The finished product overflows continuously through line 16.

We have found that the product of our process is clear, stable, substantially neutral, and noncorrosive. Although this product contains large quantites of impurities derived from wet-process phosphoric acid in a concentrated solution of ammonium phosphates, these impurities do not precipitate on long standing at room temperature, or at 32° F. They are substantially neutral in reaction and may be prepared in 8–24–0 grade, or even higher concentration.

The principal advantages gained in our process may be summarized as follows:

(1) It permits use of cheap unrefined wet-process phosphoric acid for production of clear, stable liquid fertilizers.

(2) The sequestrant is noncorrosive, so mild steel reaction equipment and storage tanks may be used. Corrosion-resistant materials are not required.

(3) The process may be readily carried out in existing plants with minimum change in equipment.

(4) Metering and control are reduced to a minimum.

(5) The process does not require rapid mixing of sequestrant to avoid hydrolysis.

(6) Storage and handling of ammoniated superphosphoric acid as sequestrant are easy and cheap.

The following examples are illustrative of results obtained with particular formulations. Comparison of known sequestering agents with ammonium salts of polyphosphoric acids is included in Example I.

*Example I*

A large number of small-scale tests were made to determine the effectiveness of the known sequestering agents—"Calgon" (sodium hexametaphosphate) and ammonium metaphosphate—in preventing the formation of precipitates when wet-process phosphoric acid is neutralized with ammonia. An 8–24–0 solution prepared by neutralizing chemically pure orthophosphoric acid with ammonia was added to wet-process phosphoric acid as a control to check the effect of dilution. Other tests were made using an 11–33–0 solution prepared by neutralizing a superphosphoric acid containing 75.7 percent $P_2O_5$, and a 13–46–0 solution prepared by neutralizing a superphosphoric acid containing 78.3 percent $P_2O_5$. This material was used in quantity sufficient to supply as ammonium polyphosphates from 5 to 25 percent of the total $P_2O_5$ desired in the product. The following procedure was used.

The ingredients were mixed, using an air-driven mixer in a 250 ml. beaker. The beaker was kept in a bath of cold water, thus maintaining a temperature of about 100° to 105° F. The wet-process phosphoric acids used were of 53.5 percent and 28.4 percent $P_2O_5$. When the 28.4 percent $P_2O_5$ acid was used, gaseous ammonia was employed to prevent dilution of the product below a desired 8–24–0 grade. Wet-process acids prepared from both Western and Florida phosphate rock were used.

Heavy precipitates formed during ammoniation in all tests in which "Calgon" or ammonium metaphosphate was used as sequestrant. The same was true in all tests in which 8–24–0 solution was used in quantity equivalent to sequestering agent.

In all tests made with ammoniated superphosphoric acid, no appreciable amount of precipitate formed during ammoniation of wet-process acid. The products were substantially clear and without precipitate after standing 7 days at 28° to 32° F., and for 1 month at room temperature. Some of the products became thixotrophic gels on standing, but were easily liquefied by slight agitation and were considered suitable for application to the soil through spray nozzles.

*Example II*

The process described above was tested on full commercial scale in batchwise operation. An ammoniated superphosphoric acid of 11–33–0 grade was measured into a mixing vessel corresponding to vessel 1 in the drawing, in quantity sufficient to supply 5 percent of the total $P_2O_5$ desired in the product as ammonium salts of polyphosphoric acids. Water, wet-process phosphoric acid (53.8 percent $P_2O_5$), and aqua ammonia were simultaneously fed directly into the mixing vessel in total quantity sufficient to produce a solution of about 8–24–0 grade. Liquid was pumped through a cooler corresponding to cooler 5 at maximum capacity of the pump. Temperature in the mixing vessel was controlled by varying the quantities of wet-process acid and ammonia introduced. The following operating data were obtained.

Production rate, tons solution/hour _____ 3.29
Average feed rate, tons/hour:
   Wet-process phosphoric acid (53.8% $P_2O_5$) __ 1.42
   Aqua ammonia (19.5% N) _____ 1.30
   Water _____ 0.57
Average reaction temperature, ° F _____ 112
Ammoniated solution:
   Final pH _____ 6.8
   Specific gravity at 80° F _____ 1.24
Chemical analysis, percent by weight:
   Total N _____ 7.7
   Total $P_2O_5$ _____ 21.6

The solution contained only a trace of settled solids. No further precipitation or salting out occurred after 30 days' storage at room temperature and at 32° F.

*Example III*

The process described in Example II was repeated on full commercial scale, with slight variation. This variation consisted in premixing the water required for an 8–24–0 solution with the wet-process phosphoric acid, thus eliminating introduction of a separate stream of water into vessel 1. The following results were obtained.

Production rate, tons solution/hour _____ 3.06
Average feed rate, tons/hour:
   Wet-process phosphoric acid (53.8% $P_2O_5$) ___ 1.32
   Aqua ammonia (19.5% N) _____ 1.21
   Water _____ 0.53
Average reaction temperature, ° F _____ 105
Ammoniated solution:
   Final pH _____ 6.6
   Specific gravity at 80° F _____ 1.27
Chemical analysis, percent by weight:
   Total N _____ 7.9
   Total $P_2O_5$ _____ 23.0

*Example IV*

A series of tests was made to determine the quantity of ammonium salts of polyphosphoric acids required for good sequestering effect. Approximately 100 grams of 8–24–0 solution were prepared in each test. The amount of water required for a final solution of the required strength was measured into a 250-ml. beaker immersed in a water bath. The amounts of ammoniated superphosphoric acid (11.0–33.9–0 grade) required to furnish the proportions of $P_2O_5$ indicated as ammonium polyphosphates were mixed with the water. Ammonia and wet-process phosphoric acid were introduced into the beaker in separate streams and were mixed rapidly with the material in the beaker. During mixing, acidity was maintained in the range from pH 4.0 to about 7.0 and the temperature was not permitted to exceed 180° F. The test samples were allowed to stand for 1 week. The traces of precipitate present were collected by filtration and their weights determined. The following results were obtained.

| Sample number | 1 | 2 | 3 |
|---|---|---|---|
| Percent of $P_2O_5$ as sequestrant | 5 | 10 | 15 |
| Formulation, percent by weight: | | | |
|   Wet-process phosphoric acid (54.3% $P_2O_5$) | 42.0 | 39.8 | 37.8 |
|   Ammoniated superphosphoric acid (11.0–33.9–0) | 3.5 | 7.1 | 10.6 |
|   $NH_4OH$ (19.05 percent N) | 38.9 | 37.8 | 35.9 |
|   $H_2O$ | 14.6 | 15.3 | 15.9 |
| Chemical analysis of product, percent by weight: | | | |
|   Total N | 7.9 | 8.1 | 8.1 |
|   Total $P_2O_5$ | 23.7 | 23.7 | 23.7 |
|   Ortho $P_2O_5$ | 23.1 | 22.4 | 22.0 |
| Filtration tests: | | | |
|   Weight of sample, grams | 60.6 | 46.4 | 54.6 |
|   Weight of precipitate, grams | 0.069 | 0.007 | 0.009 |
|   Percent of precipitate | 0.114 | 0.015 | 0.016 |

We claim as our invention:

1. A process for the manufacture of liquid fertilizer which comprises the steps of introducing ammonium salts of unhydrolyzed superphosphoric acid into a mixing vessel in such quantities as to supply as ammonium salts of polyphosphoric acids about 5 to 25 percent of the total $P_2O_5$ content of a liquid fertilizer to be produced, such quantity of salts being sufficient to maintain in solution the congeneric impurities of a later-mentioned wet-process phosphoric acid; simultaneously introducing wet-process phosphoric acid and ammonia into said mixing vessel along with said ammonium salts; therein intimately mixing said materials introduced; controlling the rate of introduction of wet-process phosphoric acid and ammonia to maintain acidity in said mixing vessel in the range from pH 4.0 to about 7.0; maintaining a temperature of not more than about 200° F. in said vessel during mixing; and withdrawing a clear, stable, noncorrosive concentrated liquid fertilizer from said mixing vessel.

2. A process for the manufacture of liquid fertilizer which comprises the steps of introducing ammonium salts of unhydrolyzed superphosphoric acid as an aqueous solution of about 11–33–0 to 13–46–0 grade into a mixing vessel in such quantity as to supply as ammonium salts of polyphosphoric acids about 5 to 10 percent of the total $P_2O_5$ content of a liquid fertilizer to be produced, such quantity of salts being sufficient to maintain in solution the congeneric impurities of a later-mentioned wet-process phosphoric acid; simultaneously introducing wet-process phosphoric acid and ammonia into said mixing vessel along with said ammonium salts; therein intimately mixing said materials introduced; controlling the rate of introduction of wet-process phosphoric acid and ammonia to maintain acidity in said mixing vessel in the range from pH 4.0 to about 7.0; maintaining a temperature of not more than about 200° F. in said vessel during mixing; and withdrawing a clear, stable, noncorrosive concentrated liquid fertilizer of not less than about 8–24–0 grade from said mixing vessel.

3. A clear, stable, noncorrosive liquid fertilizer containing about 5 to 25 percent of its total $P_2O_5$ content in the form of ammonium salts of polyphosphoric acids in such proportions to each other that about 35 to 38 percent of said ammonium salts is present as ammonium pyrophosphate, about 5 to 24 percent is present as ammonium tripolyphosphate, about 0.4 to 13 percent is present as ammonium tetrapolyphosphate, in amounts up to about 11 percent is present as ammonium pentapolyphosphate, and in amounts up to about 5 percent is present as ammonium hexapolyphosphate; containing the remainder of its total $P_2O_5$ content as orthophosphate of which about 50 to 90 percent is from wet-process phosphoric acid; and containing in solution substantially all of the congeneric impurities from said wet-process phosphoric acid.

4. A clear, stable, noncorrosive liquid fertilizer containing 5 to 10 percent of its total $P_2O_5$ content in the form of ammonium salts of polyphosphoric acids in such proportions to each other that about 35 to 38 percent of said ammonium salts is present as ammonium pyrophosphate, about 5 to 24 percent is present as ammonium tripolyphosphate, about 0.4 to 13 percent is present as ammonium tetrapolyphosphate, in amounts up to about 11 percent is present as ammonium pentapolyphosphate, and in amounts up to about 5 percent is present as ammonium hexapolyphosphate; containing the remainder of its total $P_2O_5$ content as orthophosphate of which about 80 to 90 percent is from wet-process phosphoric acid; and containing in solution substantially all of the congeneric impurities from said wet-process phosphoric acid.

References Cited in the file of this patent

UNITED STATES PATENTS

| | | |
|---|---|---|
| 2,706,180 | Sylvester | Apr. 12, 1955 |
| 2,731,420 | Sylvester | Jan. 17, 1956 |
| 2,770,540 | Vierling | Nov. 13, 1956 |
| 2,781,612 | Dugan | Feb. 19, 1957 |
| 2,799,569 | Wordie et al. | July 16, 1957 |